UNITED STATES PATENT OFFICE.

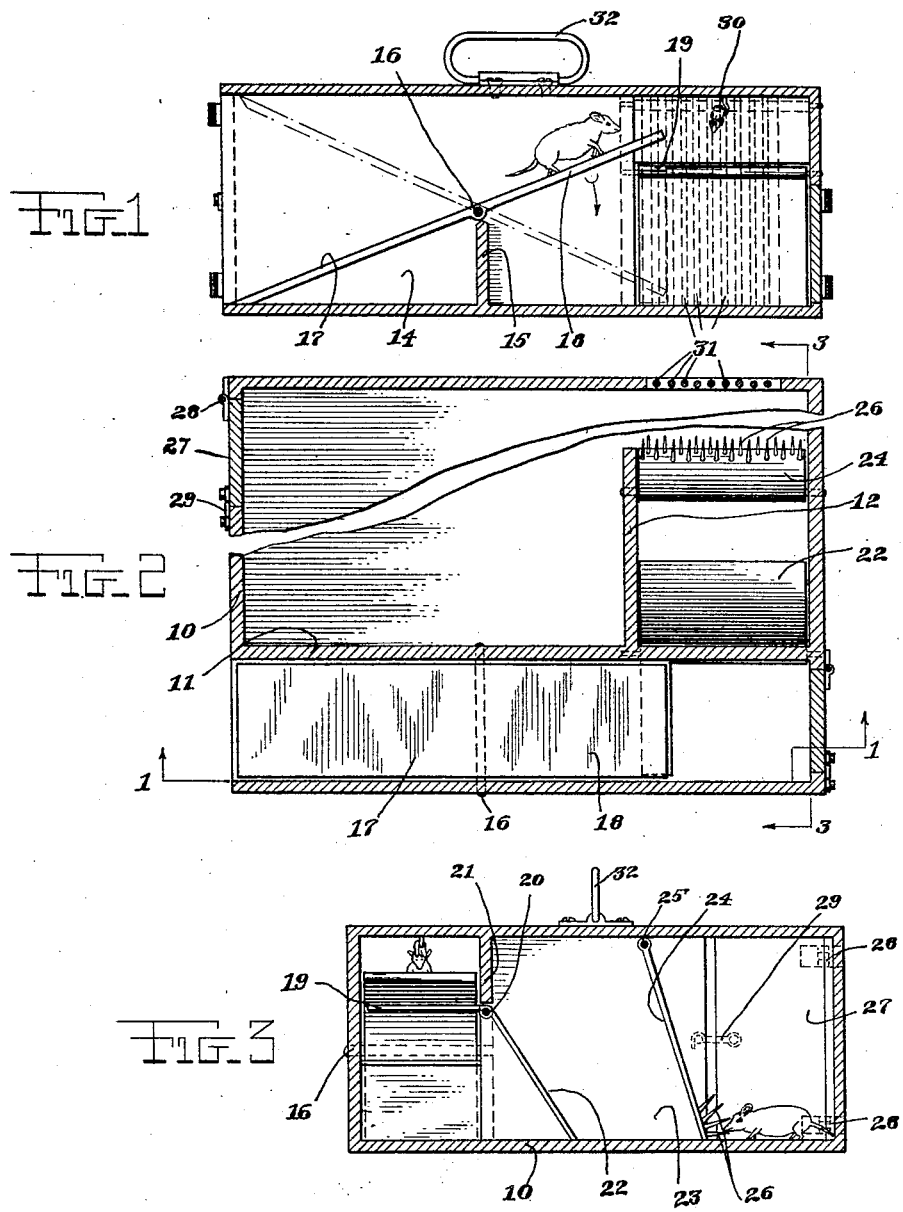

ANTONI LOKAJ, OF NORTHAMPTON, PENNSYLVANIA.

MOUSETRAP.

1,323,399.     Specification of Letters Patent.     Patented Dec. 2, 1919.

Application filed June 18, 1919. Serial No. 305,101.

*To all whom it may concern:*

Be it known that I, ANTONI LOKAJ, a citizen of Ukrainia, residing at Northampton, county of Northampton, and State of Pennsylvania, have invented certain new and useful Improvements in Mousetraps, of which the following is a specification.

This invention has for its purpose the provision of an inexpensive and automatically operated device in which mice and other rodents may be captured alive.

This object is attained by the novel construction and combination of parts hereinafter described and shown in the accompanying drawings, forming a material part of this disclosure, and in which—

Figure 1 is a vertical sectional view taken on line 1—1 of Fig. 2.

Fig. 2 is a fragmentary top plan view of the structure, the cover plate or top being removed, and Fig. 3 is a transverse sectional view taken on Fig. 2.

Referring to the drawings in detail, a rectangular casing is here generally designated by the numeral 10, the same having a partition plate 11, from which extends a lateral wall 12, a chamber 14 existing between the side walls and partition 11 of the casing, in which is a raised outer wall 15, immediately above which, pivoted on the pin 16 is a tilting platform 17, the longer beveled edge of which extends substantially through the chamber 14, while the other shorter and lighter end 18 extends into the casing and is adapted, when depressed, to make contact with a strip 19, pivoted on a pin 20, immediately below the partial partition plate 21.

Formed with the strip 19 is an angularly disposed plate 22, adapted to normally make contact with the bottom of the casing, but which is raised when the platform is tilted upon the pin 16.

The plate 22 forms a partition wall inside of the chamber 14, beyond which is a compartment 23, forming another compartment 23 in the opposite end of which is a plate 24 pivoted on the pin 25, this plate being extended diagonally and provided upon its outer, lower edge with a plurality of sharp spurs 26, while therebeyond is a hinged door 27, secured by the hinges 28, at one edge and by a hook 29 at the other.

In operation, an animal having entered the open entrance travels over the inclined surface of the platform 17, until it has passed the pivotal point attracted to the lure 30, and causes the platform to tilt, striking the strip 19, depressing the same so as to raise the plate 22, below which the animal escapes into the compartment 23 where it may remain, ordinarily however, the animal in attempting to escape will press the plate 24 inward and enter into the main compartment within the casing, the spurs 26 preventing any possible manipulation of the plate 24, holding the animal securely therein until the door 27 is opened and the captive removed.

In order to attract the animal into the main compartment, one of its side walls may be perforated or a plurality of bars inserted forming a portion of the side wall so as to admit light and air to the interior.

Having thus described my invention what I claim as new and desire to secure by Letters Patent, is—

A mouse trap comprising a rectangular casing having a plurality of compartments formed therein, and a handle by which said casing may be manipulated, of a tilting platform mounted in the first of said compartments, said platform extending from the open entrance therewithin, a lure for enticing animals suspended within said casing in alinement with said platform when in a raised position, a pivoted strip upon which the upper end of said platform is adapted to make contact when depressed, a plate extending diagonally from said strip forming one of the walls of the second compartment, a third plate pivoted to form the opposite wall of said second compartment, a plurality of spurs engaged along the outer lower edge of said third plate, said spurs extending into the main compartment of said casing, and a door in said main compartment through which access to the interior of said casing may be had.

In testimony whereof I have affixed my signature.

ANTONI LOKAJ.